(12) United States Patent
Kim et al.

(10) Patent No.: US 11,542,579 B2
(45) Date of Patent: Jan. 3, 2023

(54) IRON-BASED PREALLOY POWDER, IRON-BASED DIFFUSION-BONDED POWDER, AND IRON-BASED ALLOY POWDER FOR POWDER METALLURGY USING THE SAME

(71) Applicants: HYUNDAI MOTOR COMPANY, Seoul (KR); KIA MOTORS CORPORATION, Seoul (KR); JFE STEEL CORPORATION, Tokyo (JP)

(72) Inventors: Hak Soo Kim, Seoul (KR); Kohsuke Ashizuka, Tokyo (JP); Akio Kobayashi, Tokyo (JP); Naomichi Nakamura, Tokyo (JP); Masashi Fujinaga, Tokyo (JP); Toshio Maetani, Tokyo (JP); Hirofumi Enokido, Tokyo (JP); Hisashi Sudo, Tokyo (JP)

(73) Assignees: HYUNDAI MOTOR COMPANY, Seoul (KR); KIA MOTORS CORPORATION, Seoul (KR); JFE STEEL CORPORATION, Tokyo (JP)

( * ) Notice: Subject to any disclaimer, the term of this patent is extended or adjusted under 35 U.S.C. 154(b) by 137 days.

(21) Appl. No.: 16/831,307

(22) Filed: Mar. 26, 2020

(65) Prior Publication Data
US 2021/0071286 A1 Mar. 11, 2021

(30) Foreign Application Priority Data
Sep. 6, 2019 (KR) .................. 10-2019-0111001

(51) Int. Cl.
*B22F 1/00* (2022.01)
*C22C 38/16* (2006.01)
(Continued)

(52) U.S. Cl.
CPC ............... *C22C 38/16* (2013.01); *B22F 1/10* (2022.01); *C22C 38/12* (2013.01); *B22F 2301/35* (2013.01); *Y10T 428/12014* (2015.01)

(58) Field of Classification Search
CPC ..... C22C 33/0264; C22C 38/00; C22C 38/04; C22C 38/12; C22C 38/16; B22F 1/0003;
(Continued)

(56) References Cited

U.S. PATENT DOCUMENTS 6,068,813 A * 5/2000 Semel ................ C22C 33/0207
75/255
6,391,083 B1 5/2002 Akagi et al.
(Continued)

FOREIGN PATENT DOCUMENTS

CA 2369927 A1 12/2000
JP 50-26705 A 3/1975
(Continued)

OTHER PUBLICATIONS

Written Opinion of the International Searching Authority issued in corresponding International Patent Application No. PCT/JP2020/031531, dated Sep. 29, 2020.
(Continued)

*Primary Examiner* — Seth Dumbris
(74) *Attorney, Agent, or Firm* — Morgan, Lewis & Bockius LLP

(57) ABSTRACT

The present disclosure relates to an iron-based prealloy powder having excellent strength and processability, and an iron-based alloy powder for powder metallurgy and a sinter-forged member using the same. The iron-based prealloy powder for powder metallurgy according to an embodiment of the present disclosure includes 0.5 to 5.0 wt % of Cu, 0.1 to 0.5 wt % of Mo, and a balance of Fe and other inevitable impurities. A Cu content (Cu %) and a Mo content (Mo %) satisfy the following Relational Equation (1):

$$0.3 \times Cu\% + 3 \times Mo\% \leq 2.7 \qquad (1).$$

11 Claims, 2 Drawing Sheets

(51) Int. Cl.
*B22F 1/10* (2022.01)
*C22C 38/12* (2006.01)

(58) Field of Classification Search
CPC ...... B22F 1/0059; B22F 1/0085; B22F 1/025; B22F 3/10; B22F 3/17; B22F 5/00; B22F 5/008; B22F 2301/10; B22F 2301/35; B22F 2302/40; B22F 2303/01; B22F 2999/00; F16C 7/00; Y10T 428/12014
USPC ..... 419/1, 3, 31, 35, 38, 64; 420/8, 89, 123; 428/546
See application file for complete search history.

(56) References Cited

U.S. PATENT DOCUMENTS

| | | | |
|---|---|---|---|
| 6,696,014 B2 * | 2/2004 | Nakamura | B22F 3/12 |
| | | | 419/11 |
| 8,398,739 B2 | 3/2013 | Bengtsson et al. | |
| 10,265,766 B2 | 4/2019 | Maetani et al. | |
| 2006/0065072 A1 * | 3/2006 | Ozaki | C22C 33/0228 |
| | | | 75/231 |
| 2010/0255332 A1 * | 10/2010 | Ono | B22F 1/02 |
| | | | 428/570 |
| 2011/0283832 A1 | 11/2011 | Lindsley | |
| 2017/0349981 A1 | 12/2017 | Nakamura et al. | |

FOREIGN PATENT DOCUMENTS

| | | | | |
|---|---|---|---|---|
| JP | 11229001 A | * | 8/1999 | ................ B22F 1/00 |
| JP | H11-229001 A | | 8/1999 | |
| JP | 11-302787 A | | 11/1999 | |
| JP | 2004-513232 A | | 4/2004 | |
| JP | 2009215630 A | * | 9/2009 | ............. C22C 38/00 |
| JP | 2013-181198 A | | 9/2013 | |
| JP | 2017-061717 A | | 3/2017 | |
| KR | 10-0970796 B1 | | 7/2010 | |
| WO | 00/73001 A1 | | 12/2000 | |
| WO | 2016/092827 A1 | | 6/2016 | |
| WO | 2019/111833 A1 | | 6/2019 | |

OTHER PUBLICATIONS

Extended European Search Report dated Oct. 25, 2022, issued in corresponding European Patent Application No. 20861419.8.

* cited by examiner

[FIG. 1]
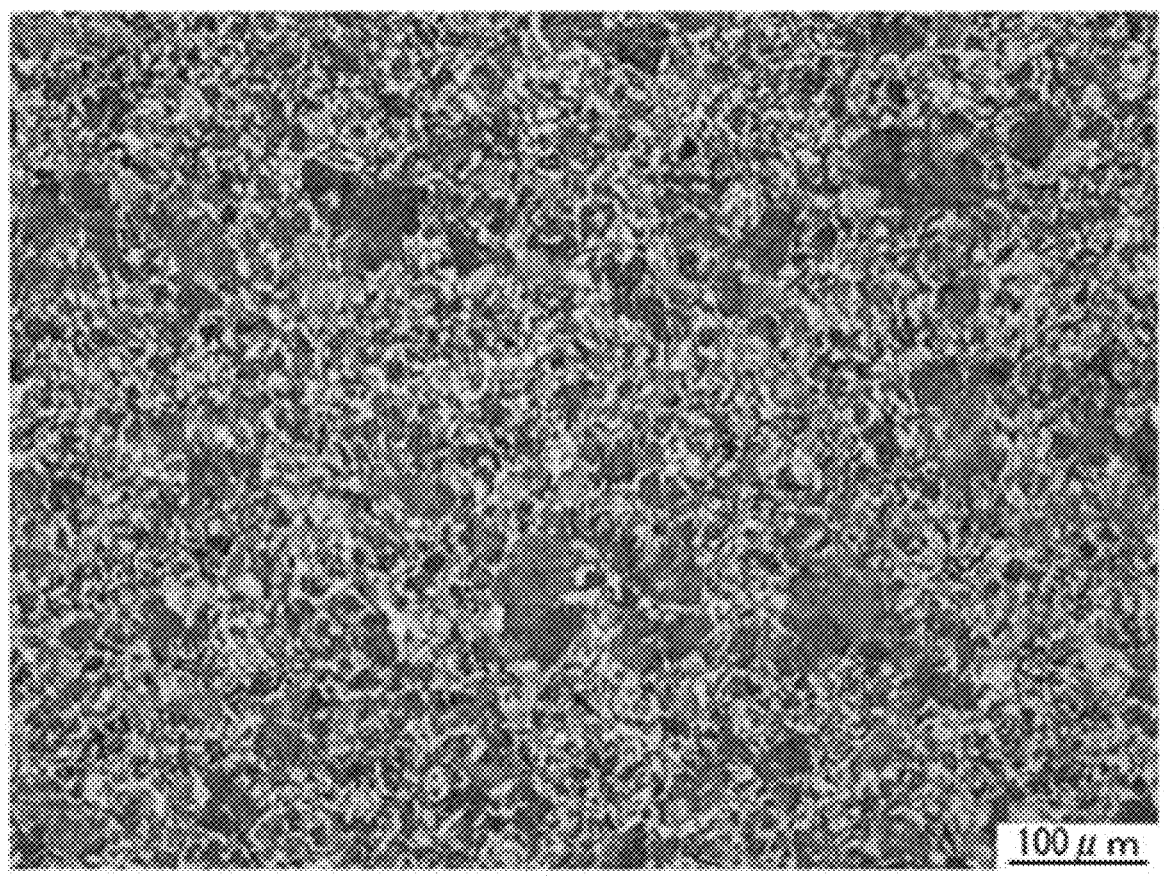

[FIG. 2]
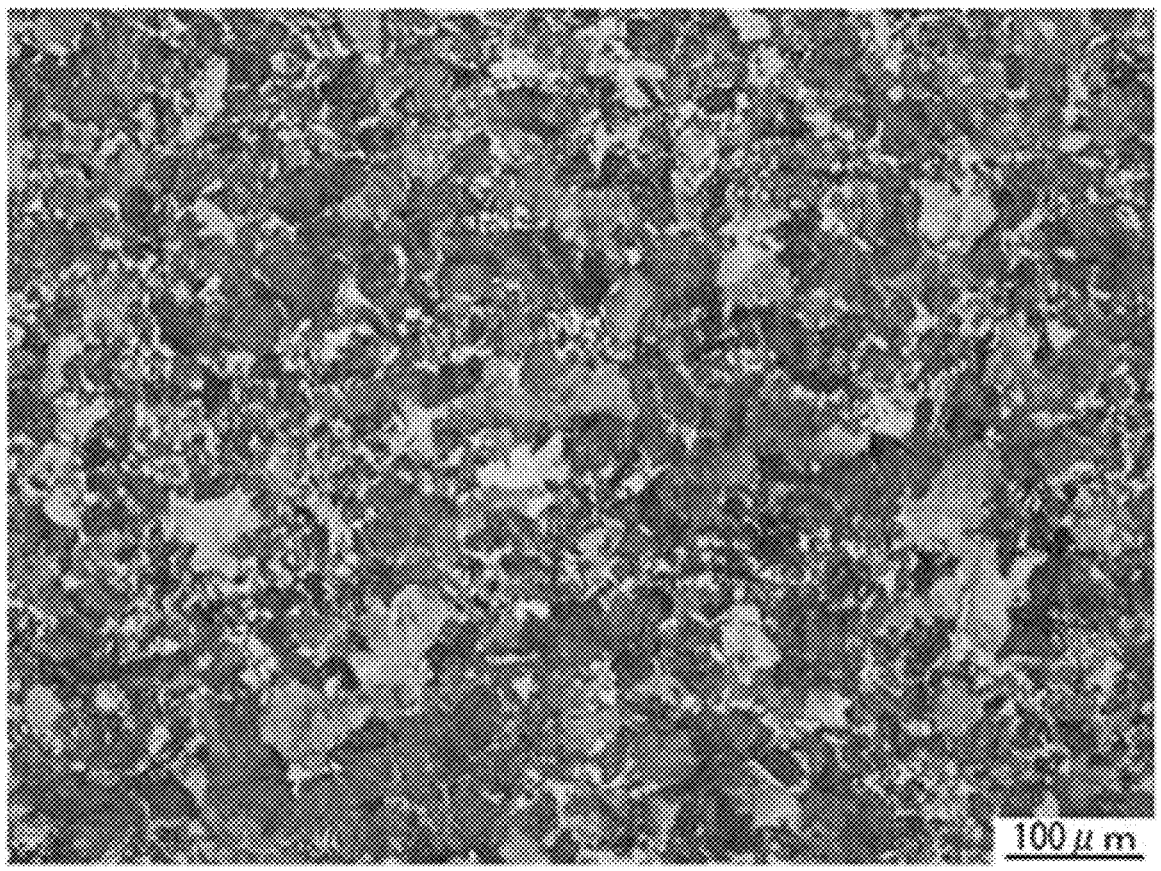

IRON-BASED PREALLOY POWDER, IRON-BASED DIFFUSION-BONDED POWDER, AND IRON-BASED ALLOY POWDER FOR POWDER METALLURGY USING THE SAME

CROSS REFERENCE TO RELATED APPLICATION

The present application claims priority to Korean Patent Application No. 10-2019-0111001, filed on Sep. 6, 2019, the entire content of which is incorporated herein for all purposes by this reference.

BACKGROUND OF THE DISCLOSURE

1. Technical Field

The present invention relates to an iron-based prealloy powder, an iron-based diffusion-bonded powder, and an iron-based alloy powder for powder metallurgy using the same. More particularly, the present invention relates to an iron-based prealloy powder, an iron-based diffusion-bonded powder, and an iron-based alloy powder for powder metallurgy using the same which is used to manufacture a sinter-forged member having excellent strength and processability.

2. Description of the Related Art

In order to cope with the high power required in an engine and a transmission of an automobile, the strength of structural parts such as a synchronizer hub and a connecting rod needs to be increased.

In general, since it is required that structural parts such as synchronizer hubs and connecting rods used in automobiles have high strength, parts obtained by performing sintering using a sintering material and then forging are used.

In general, a Fe—Cu—C series iron-based alloy powder, which includes pure iron powder mixed with copper powder and carbon powder, is frequently used as raw-material powder for sinter-forged products. Further, various additives are added to the raw-material powder in order to additionally improve the physical properties thereof. For example, a machinability-improving agent such as MnS may be added in order to improve machinability.

Currently, a prealloy powder, which is preliminarily obtained by alloying of Fe and Cu, is increasingly used as a raw-material powder for sinter-forged products so that alloy elements are sufficiently diffused into a Fe base even when a sintering temperature is not high or a sintering time is not long, instead of using conventional sinter-forged products obtained simply by mixing pure iron powder, copper powder, and carbon powder as raw-material powder.

However, the prealloy type powder has a problem in that, as the content of the alloy element is increased, the contribution to the strength improvement is lowered and the moldability is reduced.

The foregoing description of the background art is merely for the purpose of understanding the background of the present disclosure and should not be construed as an admission that it corresponds to the prior art already known to those skilled in the art.

SUMMARY OF THE DISCLOSURE

Accordingly, the present disclosure has been made keeping in mind the above problems occurring in the related art, and an object of the present disclosure is to provide an iron-based prealloy powder which is expected to have improved strength and processability without heat treatment after forging, and an iron-based alloy powder for powder metallurgy and a sinter-forged member using the same.

An iron-based prealloy powder for powder metallurgy according to an embodiment of the present disclosure includes 0.5 to 5.0 wt % of Cu (a Cu content), 0.1 to 0.5 wt % of Mo (a Mo content), and a balance of Fe and other inevitable impurities based on a total weight of the iron-based prealloy powder. The Cu content (Cu %) and Mo content (Mo %) satisfy the following Relational Equation (1).

$$0.3 \times Cu\% + 3 \times Mo\% \leq 2.7 \qquad (1)$$

The iron-based prealloy powder further includes 0.4 wt % or less of Mn (a Mn content) based on a total weight of the iron-based prealloy powder, and the Cu content (Cu %), the Mo content (Mo %), and the Mn content (Mn %) satisfy the following Relational Equation (2).

$$0.3 \times Cu\% + 3 \times Mo\% + 4 \times Mn\% \leq 2.7 \qquad (2)$$

The iron-based prealloy powder includes 0.05 to 0.4 wt % of Mn based on a total weight of the iron-based prealloy powder.

Meanwhile, an iron-based diffusion-bonded powder according to an embodiment of the present disclosure includes a Cu powder at a content of less than 5 wt % bonded to the surface of an iron-based prealloy powder, and the iron-based prealloy powder, which includes 0.5 to 5.0 wt % of Cu (a Cu content), 0.1 to 0.5 wt % of Mo (a Mo content), and a balance of Fe and other inevitable impurities based on a total weight of the iron-based prealloy powder and in which the Cu content (Cu %) and the Mo content (Mo %) satisfy the following Relational Equation (1).

$$0.3 \times Cu\% + 3 \times Mo\% \leq 2.7 \qquad (1)$$

The iron-based prealloy powder further includes 0.4 wt % or less of Mn (a Mn content) based on a total weight of the iron-based prealloy powder, and the Cu content (Cu %), the Mo content (Mo %), and the Mn content (Mn %) satisfy the following Relational Equation (2).

$$0.3 \times Cu\% + 3 \times Mo\% + 4 \times Mn\% \leq 2.7 \qquad (2)$$

The iron-based prealloy powder includes 0.05 to 0.4 wt % of Mn based on a total weight of the iron-based prealloy powder.

The Cu powder is bonded to the surface of the iron-based prealloy powder through diffusion bonding.

Meanwhile, an iron-based alloy powder for powder metallurgy according to an embodiment of the present disclosure includes 0.4 to 1.0 wt % of a carbon (C) powder, based on a total weight of the iron-based powder, mixed with a diffusion-bonded powder, and the diffusion-bonded powder. The diffusion-bonded powder includes a Cu powder at a content of less than 5 wt %, based on a total weight of the diffusion-bonded powder, bonded to the surface of an iron-based prealloy powder, and the iron-based prealloy powder, which includes 0.5 to 5.0 wt % of Cu (a Cu content), 0.1 to 0.5 wt % of Mo (a Mo content) based on a total weight of the iron-based prealloy powder, and a balance of Fe and other inevitable impurities and in which the Cu content (Cu %) and the Mo content (Mo %) satisfy the following Relational Equation (1).

$$0.3 \times Cu\% + 3 \times Mo\% \leq 2.7 \qquad (1)$$

The iron-based alloy powder further includes 0.1 to 0.3 wt % of S based on a total weight of the iron-based powder.

The iron-based alloy powder is further mixed with a lubricant.

Meanwhile, in a sinter-forged member using the iron-based prealloy powder for powder metallurgy as a raw material according to the present disclosure, a martensite area ratio is less than 5% and a yield strength is 500 MPa or more.

In addition, in a sinter-forged member using the iron-based diffusion-bonded powder according to the present disclosure, a martensite area ratio is less than 5% and a yield strength is 800 MPa or more.

Meanwhile, a sinter-forged member using the iron-based prealloy powder, the iron-based diffusion-bonded powder, and the iron-based alloy powder is an automotive connecting rod. According to an embodiment of the present disclosure, the uniform Cu distribution state is ensured even when a sintering temperature is relatively low, compared to a conventional iron-based powder, so that the strength of a sinter-forged member is improved.

Further, precipitates and microstructures are made finer due to the interaction of Cu and Mo, so that the strength of the sinter-forged member is improved.

In addition, according to the embodiment of the present disclosure, formation of martensite is suppressed even without heat treatment, so that a sinter-forged member having a high processability is obtained at a low cost by reducing the number of processes.

Therefore, the iron-based prealloy powder, the iron-based diffusion-bonded powder, and the iron-based alloy powder for powder metallurgy using the same which are capable of achieving the above-described effects are suitable for manufacturing automotive connecting rods.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a photograph showing a structure of a specimen according to an Example; and FIG. 2 is a photograph showing a structure of a specimen according to a Comparative Example.

DESCRIPTION OF THE PREFERRED EMBODIMENTS

Hereinafter, Examples of the present disclosure will be described in detail with reference to the accompanying drawings. However, the present disclosure may be embodied in many different forms and should not be construed as being limited to the Examples set forth herein. Rather, these Examples are provided so that the disclosure of this disclosure will be thorough and complete and those skilled in the art can fully understand the scope of the disclosure. In the drawings, like reference numerals refer to like elements throughout.

The present disclosure relates to an iron-based alloy powder for powder metallurgy. In order to form the iron-based alloy powder, a prealloy powder in which main components are included in alloys is preliminarily prepared, and an iron-based diffusion-bonded powder in which remaining constituents, other than the main alloy components, are bonded, preferably diffusion-bonded, to the surface of the prealloy powder is formed. In addition, various additives are mixed with the prepared iron-based diffusion-bonded powder in order to additionally improve the physical properties, thereby forming the iron-based alloy powder.

Therefore, hereinafter, a matter obtained by preliminarily forming main components mostly including alloys, followed by powderization, is referred to as "prealloy powder," a matter obtained by bonding the remaining constituents other than the main alloy components to the prealloy powder by diffusion is referred to as "diffusion-bonded powder," and a matter obtained by mixing the diffusion-bonded powder with various additives is referred to as "alloy powder."

To be specific, the present disclosure includes an iron-based prealloy powder and an iron-based diffusion-bonded powder prepared in order to manufacture an iron-based alloy powder, and also includes a sinter-forged member including the iron-based prealloy powder, the iron-based diffusion-bonded powder, and the iron-based alloy powder as raw materials. The sinter-forged member is used as a material for manufacturing an automotive connecting rod. Of course, the iron-based prealloy powder and the iron-based alloy according to the present disclosure are not to be construed to be limited to those used for manufacturing the connecting rod.

Meanwhile, the iron-based prealloy powder according to the present disclosure, prepared to manufacture the iron-based alloy powder according to an embodiment of the present disclosure, includes 0.5 to 5.0 wt % of Cu (a Cu content), 0.1 to 0.5 wt % of Mo (a Mo content), and a balance of Fe and other inevitable impurities based on a total weight of the iron-based prealloy powder.

Preferably, the Cu content (Cu %) and the Mo content (Mo %) satisfy the following Relational Equation (1).

$$0.3 \times Cu\% + 3 \times Mo\% \leq 2.7 \qquad (1)$$

Further, preferably, the iron-based prealloy powder for powder metallurgy according to the present disclosure further includes 0.4 wt % or less of Mn based on a total weight of the iron-based prealloy powder.

In addition, in the iron-based prealloy powder further including Mn, the Cu content (Cu %), the Mo content (Mo %), and an Mn content (Mn %) preferably satisfy the following Relational Equation (2).

$$0.3 \times Cu\% + 3 \times Mo\% + 4 \times Mn\% \leq 2.7 \qquad (2)$$

In the present disclosure, the reason why the main alloy components and the composition ranges thereof are limited is as follows.

The content of copper (Cu) is preferably 0.5 to 5.0 wt %. When the content of copper is lower than the range proposed, the strength is lowered. In addition, when the content of copper is higher than the range proposed, the effect of improving strength is insufficient, formability is reduced, and a dimensional change ratio is increased, making it difficult to manufacture a stable molded body.

The content of molybdenum (Mo) is preferably 0.1 to 0.5 wt %. When the content of molybdenum is lower than the range proposed, since the effect of improving strength is insufficient, the desired level of strength may not be secured. When the content of molybdenum is higher than the range proposed, formability may be reduced, thus damaging a mold. Further, when the content of molybdenum is higher than the range proposed, the effect of improving strength is insufficient and too much martensite structure is folioed, so processability and toughness are reduced. Accordingly, the content of molybdenum (Mo) is preferably limited to 0.1 to 0.5 wt %. More preferably, the content of molybdenum (Mo) is limited to 0.1 to 0.3 wt %. The reason is that the limitation contributes to the refinement of ferrite, pearlite, and bainite structures and it becomes easy to convert pearlite into bainite, thus increasing the effect of improving strength and toughness.

The content of manganese (Mn) is preferably 0.4 wt % or less. When the content of manganese is higher than 0.4 wt %, formability is reduced and oxides are generated, thus reducing strength. It is further preferable to limit the minimum value of the manganese content to 0.05 wt %. The reason is that the pearlite structure becomes finer when manganese is included in an amount of 0.05 wt % or more.

In addition, in the iron-based prealloy powder for powder metallurgy, the remaining constituents other than the above-described components are Fe and inevitably contained impurities.

Meanwhile, in the iron-based diffusion-bonded powder for powder metallurgy according to the present disclosure, a Cu powder may be bonded in an amount of less than 5 wt % to the surface of the iron-based prealloy powder.

When the amount of copper (Cu) bonded to the surface of the iron-based prealloy powder is 5 wt % or more, there are problems in that the effect of improving strength is saturated and the dimensional change ratio before and after sintering becomes large.

Meanwhile, it is preferable to diffusion-bond copper (Cu) to the surface of the iron-based prealloy powder in order to improve the strength, rather than merely mixing copper (Cu) with the iron-based prealloy powder. As the copper (Cu) powder used for the diffusion bonding, it is preferable to use a powder having a size of 50 μm or less.

Diffusion bonding means the state in which the copper powder is diffused to the surface of the prealloy powder through heat treatment after mixing the prepared prealloy powder and the copper powder, thereby achieving bonding.

For example, in order to perform diffusion bonding, first, the prealloy powder and the copper powder are mixed using a predetermined conventionally known method (V-type mixer, double-cone mixer, Henschel mixer, or Nauta mixer). When the powders are mixed, a binder such as machine oil may be added in order to prevent segregation of the copper powder. When the prealloy powder and the copper powder are mixed as described above, the mixture may be maintained in a reduction atmosphere at a temperature ranging from 700 to 1000° C. for about 0.5 to 2 hours so as to be heat-treated, thus diffusion-bonding the copper powder to the surface of the prealloy powder.

Of course, the method of diffusion-bonding the copper powder to the surface of the prealloy powder is not limited to the above-described method and conditions, but may be performed in the state of being modified into various methods and conditions capable of diffusion-bonding the copper powder to the surface of the prealloy powder.

Meanwhile, the iron-based alloy powder for powder metallurgy according to the present disclosure is folioed by mixing various additives with the above-described iron-based diffusion-bonded powder.

For example, the iron-based alloy powder may be formed by mixing carbon (C) powder with the iron-based diffusion-bonded powder to improve the strength. For example, as the carbon (C) powder, any one or both of graphite powder and carbon black powder may be used. Either of natural graphite and synthetic graphite may be used as the graphite powder.

Meanwhile, the content of carbon (C) is preferably 0.4 to 1.0 wt %. When the content of carbon is lower than the range proposed, the formation of ferrite structure is increased, thus reducing the strength. When the content of carbon is higher than the range proposed, carbide is formed, so processability is reduced or the formation of austenite structure is increased, thus reducing the strength.

Further, the iron-based alloy powder may be folioed by further mixing sulfur (S) with the iron-based diffusion-bonded powder in order to improve processability.

The content of sulfur (S) is preferably 0.1 to 0.3 wt %. When the content of sulfur (S) is less than 0.1 wt %, the effect of improving processability cannot be expected. When the content of sulfur (S) is more than 0.3 wt %, the tensile strength is reduced.

Meanwhile, sulfur (S) is preferably mixed with the prealloy powder in the form of MnS powder separately from the prealloy powder and the diffusion-bonded powder. MnS has a composite bonding constitution, rather than a bonding ratio of 1:1, and a ratio of about 3:1 to 5:1 is preferable.

Further, the iron-based alloy powder may be formed by further mixing a lubricant with the iron-based diffusion-bonded powder in order to improve lubricity.

The iron-based alloy powder may be formed by mixing one or more of carbon (C), sulfur (S), and the lubricant described above together if necessary. Further, functional additives other than the proposed additive may be further mixed within the range in which the physical properties of the iron-based alloy powder are not reduced, thus forming the iron-based alloy powder.

In the present disclosure, molten steel or powder having the above-described composition and additives are used to manufacture the iron-based prealloy powder having excellent strength and processability, the iron-based diffusion-bonded powder, and the iron-based alloy powder for powder metallurgy using the same.

In particular, when the contents of the prealloy powder, the diffusion-bonded powder, and the alloy powder are adjusted, the amounts of Cu, Mo, and Mn are preferably limited so as to satisfy the above-described Relational Equations (1) and (2) so that the martensite area ratio of the sinter-forged member manufactured using the prealloy powder, the diffusion-bonded powder, and the alloy powder as raw materials is maintained at less than 5%, the yield strength thereof is maintained at 500 MPa or higher, and processability thereof is improved.

When the amounts do not satisfy Relational Equations (1) and (2), processability is reduced.

Meanwhile, in order to maintain the martensite area ratio of the sinter-forged member manufactured using the alloy powder as a raw material at less than 5% and to maintain the yield strength at 800 MPa or more while maintaining excellent machinability, it is preferable to form the diffusion-bonded powder by diffusion-bonding the copper (Cu) powder at a content of less than 5 wt % to the surface of the prealloy powder.

Hereinafter, the present disclosure will be described using Comparative Examples and Examples.

The final products were produced according to the production conditions for commercially produced iron-based powder for powder metallurgy. The final products were used to manufacture specimens, and the martensite area ratio, yield strength, and processability thereof were then measured.

First, in order to check the characteristics of the iron-based prealloy powder, molten steel in which the content of each component was adjusted as shown in Table 1 below was prepared, and then an prealloy powder was manufactured using a water atomization method. To the iron-based prealloy powder, 0.7 parts by weight of graphite powder, 0.8 parts by weight of a lubricant (zinc stearate), and 0.5 parts by weight of MnS powder were added as additives based on 100 parts by weight of the iron-based prealloy powder before diffusion bonding of Cu, followed by mixing in a double-cone mixer.

In Table 1, First Example Group is an Example in which manganese (Mn) is not contained as a prealloy component, and Second Example Group is an Example in which manganese (Mn) is contained as a prealloy component.

Meanwhile, each of Comparative Examples and Examples included Fe and inevitable impurities as the remaining constituents other than Cu, Mo, Mn, and C constituting the iron-based prealloy powder.

TABLE 1

| Classification (No.) | Cu (wt %) | Mo (wt %) | Mn (wt %) | A value | Note |
|---|---|---|---|---|---|
| 1 | 0.5 | — | 0.1 | 0.55 | Comparative Example |
| 2 | — | 0.1 | 0.1 | 0.7 | Comparative Example |
| 3 | — | 0.4 | 0.1 | 1.6 | Comparative Example |
| 4 | 3 | 0.5 | 0.1 | 2.8 | Comparative Example |
| 5 | 0.5 | 0.6 | 0.1 | 2.35 | Comparative Example |
| 6 | 0.5 | 0.1 | 0.05 | 0.65 | Second Example Group |
| 7 | 3 | 0.1 | — | 1.2 | First Example Group |
| 8 | 3.5 | 0.4 | 0.1 | 2.65 | Second Example Group |
| 9 | 5 | 0.1 | 0.1 | 2.2 | Second Example Group |
| 10 | 3 | 0.45 | 0.1 | 2.65 | Second Example Group |
| 11 | 5 | 0.25 | 0.1 | 2.65 | Second Example Group |
| 12 | 0.5 | 0.1 | 0.4 | 2.05 | Second Example Group |
| 13 | 0.5 | 0.5 | 0.1 | 2.05 | Second Example Group |
| 14 | 0.5 | 0.3 | 0.4 | 2.65 | Second Example Group |
| 15 | 2.5 | 0.1 | 0.4 | 2.65 | Second Example Group |

In Table 1, the A value means a value calculated using 0.3×Cu %+3×Mo %+4×Mn %.

Meanwhile, with respect to the manufacture of a specimen, a specimen having a size of 10×15×55 mm was molded at a molding pressure of 7 ton/cm$^2$ and then heat-treated at 1120° C. for 20 minutes in an RXgas atmosphere, and forging was performed so that a density was 7.76 or more. In addition, final processing was performed to obtain L50× W13×t4 mm.

With the specimen thus prepared, the area ratio of the structure, especially the martensite area ratio, was measured, and the yield strength and processability were also measured.

The processability was evaluated according to the following Tables 2 and 3.

TABLE 2

| Drilling condition | Hole diameter | mm | 1 |
| | Material | | High speed drill No coated (Fujikoshi, Type sd 1.0) |
| Speed | | m/min | 31.4 |
| Feed rate | | Mm/rev | 0.05 |

TABLE 2-continued

| RPM | Rev/min | 10000 |
| Feed | Mm/min | 500 |
| Cooling water | | Used |

TABLE 3

| | Evaluation result (example) | | | | | |
|---|---|---|---|---|---|---|
| | Thrust force (N) | | Torque (N · m) | | Width of flank wear (μm) | |
| Perforation number | 10 | 50 | 10 | 50 | 10 | 50 |
| Result | 150 | 152 | 0.114 | 0.107 | 112 | 103 |

The results of the martensite area ratio, the yield strength, and the processability measured by the above-described measurement method are shown in the following Table 4.

TABLE 4

| Classification | Martensite area ratio (%) | Yield strength (Mpa) | Processability | Note |
|---|---|---|---|---|
| 1 | 0 | 484 | ○ | Comparative Example |
| 2 | 0 | 451 | ○ | Comparative Example |
| 3 | 0 | 490 | ○ | Comparative Example |
| 4 | 5 | 770 | x | Comparative Example |
| 5 | 5 | 532 | x | Comparative Example |
| 6 | 0 | 531 | ○ | Second Example Group |
| 7 | 0 | 785 | ○ | First Example Group |
| 8 | 2 | 855 | ○ | Second Example Group |
| 9 | 0 | 813 | ○ | Second Example Group |
| 10 | 3 | 827 | ○ | Second Example Group |
| 11 | 2 | 862 | ○ | Second Example Group |
| 12 | 0 | 534 | ○ | Second Example Group |
| 13 | 0 | 547 | ○ | Second Example Group |
| 14 | 4 | 684 | ○ | Second Example Group |
| 15 | 3 | 760 | ○ | Second Example Group |

As shown in Table 4, it was confirmed that all of specimens No. 6 to No. 15, which were the specimens according to First and Second Example Groups according to the present disclosure, had a martensite area ratio of less than 5%, a yield strength of 500 MPa or more, and excellent processability.

In particular, No. 8 to No. 11 had A values of 2.20 or higher, satisfactory martensite area ratios of less than 5%, excellent processability, and yield strength exceeding 800 MPa, which indicate a very high strength improvement effect. As a result, it was confirmed that limiting the A value to 2.20 or higher can maximize the yield strength improvement effect.

Meanwhile, specimen No. 1 was a Comparative Example in which Mo was not contained, no martensite was formed, and the processability was excellent but the yield strength was lower than the desired level.

No. 2 and No. 3 specimens were Comparative Examples in which Cu was not contained, no martensite was formed, and the processability was excellent but the yield strength was lower than the desired level.

The contents of Cu, Mo, and Mn in specimen No. 4 satisfied the contents proposed in the present disclosure. However, specimen No. 4 was a Comparative Example in which the condition for the A value was not satisfied. Excellent yield strength was exhibited but it was confirmed that martensite was excessively formed, resulting in poor processability.

Specimen No. 5 was a Comparative Example in which Mo was contained in an amount exceeding the content proposed in the present disclosure. Comparatively excellent yield strength was exhibited, but it was confirmed that martensite was excessively folioed, resulting in poor processability.

Next, an experiment was performed to investigate the effect of forming the prealloy using the Cu and Mo components.

For this purpose, the content of each component was adjusted as shown in the following Table 5. Specimen No. 16 was prepared as a specimen including a prealloy of all of Cu, Mo, and Mn. In addition, in specimens No. 17 and No. 18, a prealloy of Mo and Mn was prepared and a Cu component was bonded to the prealloy. In specimens No. 19 and No. 20, a prealloy of Cu and Mn was prepared and a Mo component was bonded to the prealloy. In specimens No. 17 and No. 19, the Cu powder or the Mo powder was diffusion-bonded to the prealloy. In specimens No. 18 and No. 20, the Cu powder or the Mo powder was simply mixed with (simply bonded to) the prealloy.

In addition, the martensite area ratio, yield strength, and processability were measured for each specimen, and the results are shown in the following Table 6.

TABLE 5

| Classification (No.) | Cu (wt %) | Mo (wt %) | Mn (wt %) | A value | Note |
|---|---|---|---|---|---|
| 16 | 3 | 0.1 | 0.1 | 1.6 | Example |
| 17 | 3 | 0.1 | 0.1 | 0.7 | Comparative Example of Cu diffusion bonding |
| 18 | 3 | 0.1 | 0.1 | 0.7 | Comparative Example of Cu mixing |
| 19 | 3 | 0.1 | 0.1 | 1.3 | Comparative Example of Mo diffusion bonding |
| 20 | 3 | 0.1 | 0.1 | 1.3 | Comparative Example of Mo mixing |

TABLE 6

| Classification (No.) | Martensite area ratio (%) | Yield strength (Mpa) | Processability | Note |
|---|---|---|---|---|
| 16 | 0 | 792 | ○ | Example |
| 17 | 0 | 660 | ○ | Comparative Example of Cu diffusion bonding |
| 18 | 0 | 642 | ○ | Comparative Example of Cu mixing |
| 19 | 0 | 754 | ○ | Comparative Example of Mo diffusion bonding |
| 20 | 0 | 739 | ○ | Comparative Example of Mo mixing |

As shown in Table 6, it was confirmed that all of specimens No. 16 to No. 20 had a martensite area ratio of less than 5%, yield strength of 500 MPa or more, and excellent processability. However, it was confirmed that the yield strength of specimen No. 16 in which the prealloy of Cu, Mo, and Mn was prepared was relatively higher than the yield strength of specimens No. 17 to No. 20 obtained by diffusion-bonding or mixing the Cu powder or the Mo powder with the prealloy. Further, in the case of the bonded powders, it was confirmed that the yield strength of specimens No. 17 and No. 19 in which the Cu powder or the Mo powder was diffusion-bonded was higher than the yield strength of specimens No. 18 and No. 20 in which the Cu powder or the Mo powder was bonded by simple mixing.

Next, an experiment was performed to investigate the effect of a change in the physical properties of the diffusion-bonded powder depending on the amount of Cu diffusion-bonded to the prealloy.

For this purpose, the amount of Cu powder diffusion-bonded to the prealloy according to No. 16 described above was adjusted as shown in Table 7 below. The martensite area ratio, yield strength, and processability were measured for each specimen, and the results are shown together in the following Table 7.

TABLE 7

| Classification | Additional diffusion adhesion Cu(wt %) | Martensite area ratio (%) | Yield strength (Mpa) | Machinability | Note |
|---|---|---|---|---|---|
| 21 | 0.5 | 0 | 813 | ○ | Inventive Example |
| 22 | 2.5 | 0 | 847 | ○ | Inventive Example |
| 23 | 4 | 0 | 875 | ○ | Inventive Example |
| 24 | 5 | 0 | 865 | ○ | Comparative Example |

As shown in Table 7, it was confirmed that all of specimens No. 21 to No. 23, in which the amount of diffusion-bonded Cu was less than 5%, had a martensite area ratio of less than 5%, yield strength of 800 MPa or more, and excellent processability.

However, it was confirmed that specimen No. 24, in which the amount of diffusion-bonded Cu was 5%, had yield strength lower than that of specimen No. 23.

Therefore, it was confirmed that it is preferable to limit the amount of diffusion-bonded Cu to less than 5% so as to maximize the strength improvement effect.

Next, an experiment was performed to investigate the influence of prealloying individual components constituting the alloy powder on refinement of the structure.

For this purpose, the specimens according to the Examples, in which the alloy elements according to the above-mentioned No. 7 were prealloyed, and the Comparative Examples, in which only Fe and Cu were prealloyed, were manufactured, and the structure thereof was observed. The results are shown in FIGS. 1 and 2.

FIG. 1 is a photograph showing a structure of a specimen according to an Example, and FIG. 2 is a photograph showing a structure of a specimen according to a Comparative Example. It was confirmed that the structure of the specimen according to the Example was relatively finer than the structure of the specimen according to the Comparative Example.

Based on these results, it can be deduced that preliminary prealloying of alloy components such as Cu and Mo for the manufacture of the iron-based powder as in the present disclosure is effective in improving strength and processability.

Although the present disclosure has been described with reference to the accompanying drawings and the preferred embodiments described above, the present disclosure is not limited thereto but is limited by the following claims. Accordingly, those skilled in the art will appreciate that various modifications and changes may be made thereto without departing from the spirit of the following claims.

What is claimed is:

1. An iron-based prealloy powder for powder metallurgy, consisting of:
   0.5 to 5.0 wt % of Cu (a Cu content), 0.1 to 0.5 wt % of Mo (a Mo content), 0.05 to 0.4 wt % of Mn (a Mn content), and a balance of Fe and other inevitable impurities,
   wherein the Cu content (Cu %) and the Mo content (Mo %) satisfy Relational Equation (1) and Relational Equation (2):

$2.2 \leq 0.3 \times Cu\% + 3 \times Mo\% \leq 2.7$     Relational Equation (1)

$2.2 \leq 0.3 \times Cu\% + 3 \times Mo\% + 4 \times Mn\% \leq 2.7$     Relational Equation (2).

2. A diffusion-bonded powder for powder metallurgy, comprising:
   a Cu powder bonded to a surface of an iron-based prealloy powder in an amount of 5 wt % or less, wherein the iron-based prealloy powder consists of 0.5 to 5.0 wt % of Cu (a Cu content), 0.1 to 0.5 wt % of Mo (a Mo content), 0.05 to 0.4 wt % of Mn (a Mn content), and a balance of Fe and other inevitable impurities, and in which the Cu content (Cu %) and the Mo content (Mo %) satisfy Relational Equation (1) and Relational Equation (2):

$2.2 \leq 0.3 \times Cu\% + 3 \times Mo\% \leq 2.7$     Relational Equation (1)

$2.2 \leq 0.3 \times Cu\% + 3 \times Mo\% + 4 \times Mn\% \leq 2.7$     Relational Equation (2).

3. An iron-based alloy powder for powder metallurgy, comprising:
   0.4 to 1.0 wt % of a C powder, based on a total weight of the iron-based powder mixed with a diffusion-bonded powder, wherein
   the diffusion-bonded powder includes
   a Cu powder bonded to a surface of an iron-based prealloy powder in an amount of 5 wt % or less, and
   the iron-based prealloy powder consists of 0.5 to 5.0 wt % of Cu (a Cu content), 0.1 to 0.5 wt % of Mo (a Mo content), 0.05 to 0.4 wt % of Mn (a Mn content), and a balance of Fe and other inevitable impurities, wherein the Cu content (Cu %) and the Mo content (Mo %) satisfy Relational Equation (1) and Relational Equation (2):

$2.2 \leq 0.3 \times Cu\% + 3 \times Mo\% \leq 2.7$     Relational Equation (1)

$2.2 \leq 0.3 \times Cu\% + 3 \times Mo\% + 4 \times Mn\% \leq 2.7$     Relational Equation (2).

4. The iron-based alloy powder of claim 3, wherein the iron-based alloy powder further includes 0.1 to 0.3 wt % of S.

5. The iron-based alloy powder of claim 3, wherein the iron-based alloy powder is further mixed with a lubricant.

6. A sinter-forged member manufactured using the iron-based prealloy powder of claim 1 as a raw material,
   wherein a martensite phase of the sinter-forged member is less than 5% by area, and
   wherein the sinter-forged member has a yield strength of 800 MPa or more.

7. The sinter-forged member of claim 6, wherein the sinter-forged member is an automotive connecting rod.

8. A sinter-forged member manufactured using the iron-based diffusion-bonded powder of claim 2 as a raw material,
   wherein a martensite phase of the sinter-forged member is less than 5% by area, and
   wherein the sinter-forged member has a yield strength of 800 MPa or more.

9. The sinter-forged member of claim 8, wherein the sinter-forged member is an automotive connecting rod.

10. A sinter-forged member manufactured using the iron-based alloy powder of claim 3 as a raw material,
    wherein a martensite phase of the sinter-forged member is less than 5% by area, and
    wherein the sinter-forged member has a yield strength of 800 MPa or more.

11. The sinter-forged member of claim 10, wherein the sinter-forged member is an automotive connecting rod.

* * * * *